(12) United States Patent
Zsombory et al.

(10) Patent No.: US 9,278,691 B1
(45) Date of Patent: Mar. 8, 2016

(54) VEHICLE LANE DEPARTURE SYSTEM BASED ON MAGNETIC FIELD FLUX DETECTION

(71) Applicant: Flextronics AP, LLC, Broomfield, CO (US)

(72) Inventors: Sandor Zsombory, Newmarket (CA); Gregory A. Polityka, Courtice (CA)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 14/489,714

(22) Filed: Sep. 18, 2014

(51) Int. Cl.
*B60Q 9/00* (2006.01)
*B60W 30/12* (2006.01)

(52) U.S. Cl.
CPC .............. *B60W 30/12* (2013.01); *B60Q 9/00* (2013.01); *B60W 2400/00* (2013.01); *B60W 2420/503* (2013.01)

(58) Field of Classification Search
CPC ..... B60R 21/013; G01C 21/26; G05D 1/0263
See application file for complete search history.

(56) References Cited

U.S. PATENT DOCUMENTS

| 2,493,755 A | 1/1950 | Ferrill, Jr. |
| 3,668,624 A | 6/1972 | Spaulding |
| 5,347,456 A | 9/1994 | Zhang et al. |
| 6,035,248 A | 3/2000 | Nagai et al. |
| 7,839,271 B2 | 11/2010 | Hole et al. |
| 2004/0246112 A1* | 12/2004 | Strumolo ............... B60Q 9/008 340/435 |

FOREIGN PATENT DOCUMENTS

| DE | 19941001 A1 | 3/2001 |
| FR | 2871274 A1 | 12/2005 |
| JP | 2000227998 A | 8/2000 |

* cited by examiner

*Primary Examiner* — Mussa A Shaawat
*Assistant Examiner* — Yuen Wong
(74) *Attorney, Agent, or Firm* — Volpe and Koenig, P.C.

(57) ABSTRACT

Described herein is a system and method that recognizes vehicle lane departure in road conditions affected by environmental conditions. The system uses magnetic field flux detection to determine if a vehicle is departing from a projected vehicle trajectory or a determined vehicle position between lanes. A magnetic material is applied to the stripes painted on road surfaces or on other applicable lane boundary indicators. The system uses magnetic field flux sensors or Hall Effect sensors mounted in the vehicle to recognize changes in magnetic field flux from the magnetized road stripe. These changes in magnetic field flux are interpreted by the system to determine whether alarms should be initiated for vehicle lane departure.

17 Claims, 8 Drawing Sheets

VEHICLE LANE DEPARTURE SYSTEM BASED ON MAGNETIC FIELD FLUX DETECTION

FIELD OF INVENTION

This application is related to vehicular systems.

BACKGROUND

Lane departure is an automotive enhanced driving assistance feature. The current lane departure technology is based and dependent on the camera sensing capability of recognizing, and analyzing the road guide lines and stripes. The prior systems have limitations and will work only in ideal and limited conditions. It is not always possible for the camera to "visually" see the road guide lines and road delimitation stripes, for example when the road is subjected to environmental conditions such as being covered by snow, dust or sand due to weather conditions.

SUMMARY

Described herein is a system and method that recognizes vehicle lane departure in road conditions affected by environmental conditions. The system uses magnetic field flux detection to determine if a vehicle is departing from a projected vehicle trajectory or a determined vehicle position between lanes. A magnetic material is applied to the stripes painted on road surfaces or on other applicable lane boundary indicators. The system uses magnetic field flux sensors or Hall Effect sensors mounted in the vehicle to recognize changes in magnetic field flux from the magnetized road stripe. These changes in magnetic field flux are interpreted by the system to determine whether alarms should be initiated for vehicle lane departure.

DETAILED DESCRIPTION

Figure 1:
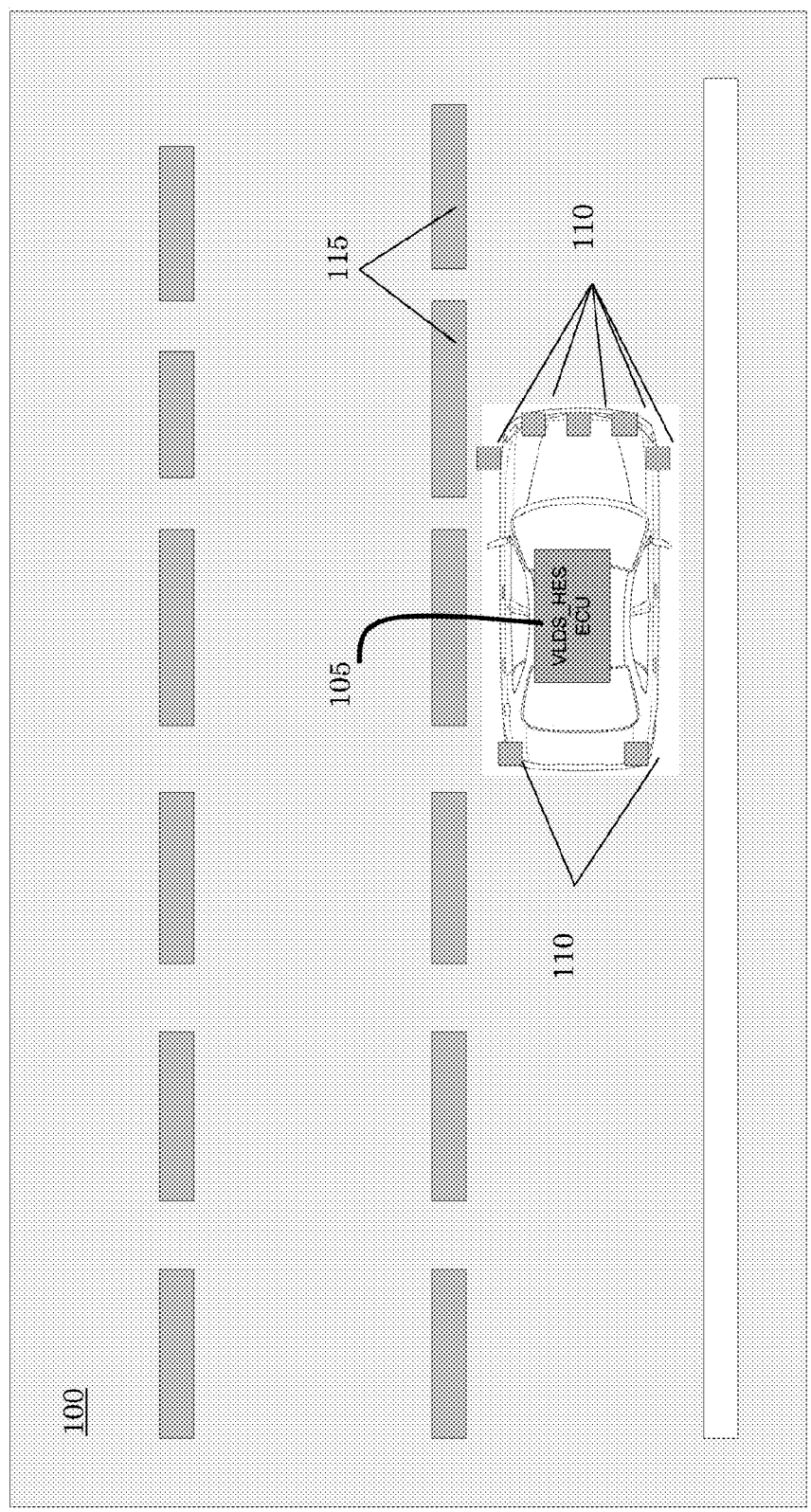
FIG. 1 is an example high level system diagram of a vehicle lane departure system based on magnetic field flux detection in accordance with an embodiment.

It is to be understood that the figures and descriptions of embodiments of a system and method for vehicle lane departure based on magnetic field flux detection have been simplified to illustrate elements that are relevant for a clear understanding, while eliminating, for the purpose of clarity, many other elements found in typical vehicle systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

The non-limiting embodiments described herein are with respect to a system and method for vehicle lane departure based on magnetic field flux detection. Other electronic devices, modules and applications may also be used in view of these teachings without deviating from the spirit or scope as described herein. The system and method for vehicle lane departure based on magnetic field flux detection may be modified for a variety of applications and uses while remaining within the spirit and scope of the claims. The embodiments and variations described herein, and/or shown in the drawings, are presented by way of example only and are not limiting as to the scope and spirit. The descriptions herein may be applicable to all embodiments of the system and method for vehicle lane departure based on magnetic field flux detection although it may be described with respect to a particular embodiment.

The description herein relates to a vehicle lane departure system based on magnetic field flux detection and in particular, the use of Hall Effect sensor (HES) technology to detect changes in the magnetic field flux. The use of the HES is illustrative and other magnetic field flux detection sensors may be used without deviating from the scope of the description and claims herein.

In general, the vehicle lane departure system based on Hall Effect sensor technology (VLDS-HES) is an advanced driver assistance system (ADAS) designed to recognize vehicle lane departure in road conditions affected by environmental conditions. The magnetized road lines act as a guidance system for the vehicle and operator and are a part of the today's traffic signaling infrastructure. The VLDS-HES proposes to be a cost effective guidance system by using paint with magnetic properties, although other implementations are also possible. This requires virtually no changes to the current road infrastructure. As described herein below, the VLDS-HES utilize a basic uni-polar or bi-polar Hall sensor, which implementation may depend on the road configuration and functions.

FIG. 1 is an embodiment of a vehicle lane departure system based on magnetic field flux detection and in particular, a vehicle lane departure system based on Hall Effect sensor technology (VLDS-HES) 100. The VLDS-HES 100 includes, but is not limited to, a VLDS-HES electronics control module (VLDS-HES ECU) 105, a plurality of VLDS-HES sensors 110 strategically located on the vehicle of interest and road or curb markers, guide lines, stripes, lane markers, and the like that are painted, coated or otherwise have some form of magnetic material (collectively "magnetic marker 115") that provides a predetermined amount of magnetic flux that can be detected and read by the VLDS-HES sensors 110 and provided as an input to the VLDS-HES ECU 105 for interpretation as described herein below.

The VLDS-HES 100 is a cost effective solution that can augment or replace the current lane departure systems by providing an enhanced lane departure solution for vehicles. In general, the VLDS-HES 100 uses sensing technology that recognizes changes in magnetic field flux from the magnetic marker 115. These changes in the magnetic field flux are interpreted by the VLDS-HES ECU 105 to determine the vehicle's position between the lanes. Hence, if the road is covered by snow, dust, sand or any non-magnetic material, the VLDS-HES sensors 110 will not be affected and continue to provide reliable road data. That is, the lane departure function will continue to work in environmental conditions that other lane departure systems are normally affected by as mentioned herein above.

In an embodiment, the VLDS-HES 100 can work with one sensor or an array of sensors for increased reliability and additional features. In another embodiment, the VLDS-HES 100 may be used in conjunction with lane departure technology that visually monitors road markers using cameras.

As described herein below, in another embodiment, the VLDS-HES 100 may measure stripe length or shapes with the VLDS-HES sensor 110, provide cost effective automated speed zones and speed indictors, provide traffic triage and may possibly be implemented for traffic automation and/or augmentation or enable autonomous vehicle driving.

Figure 2:
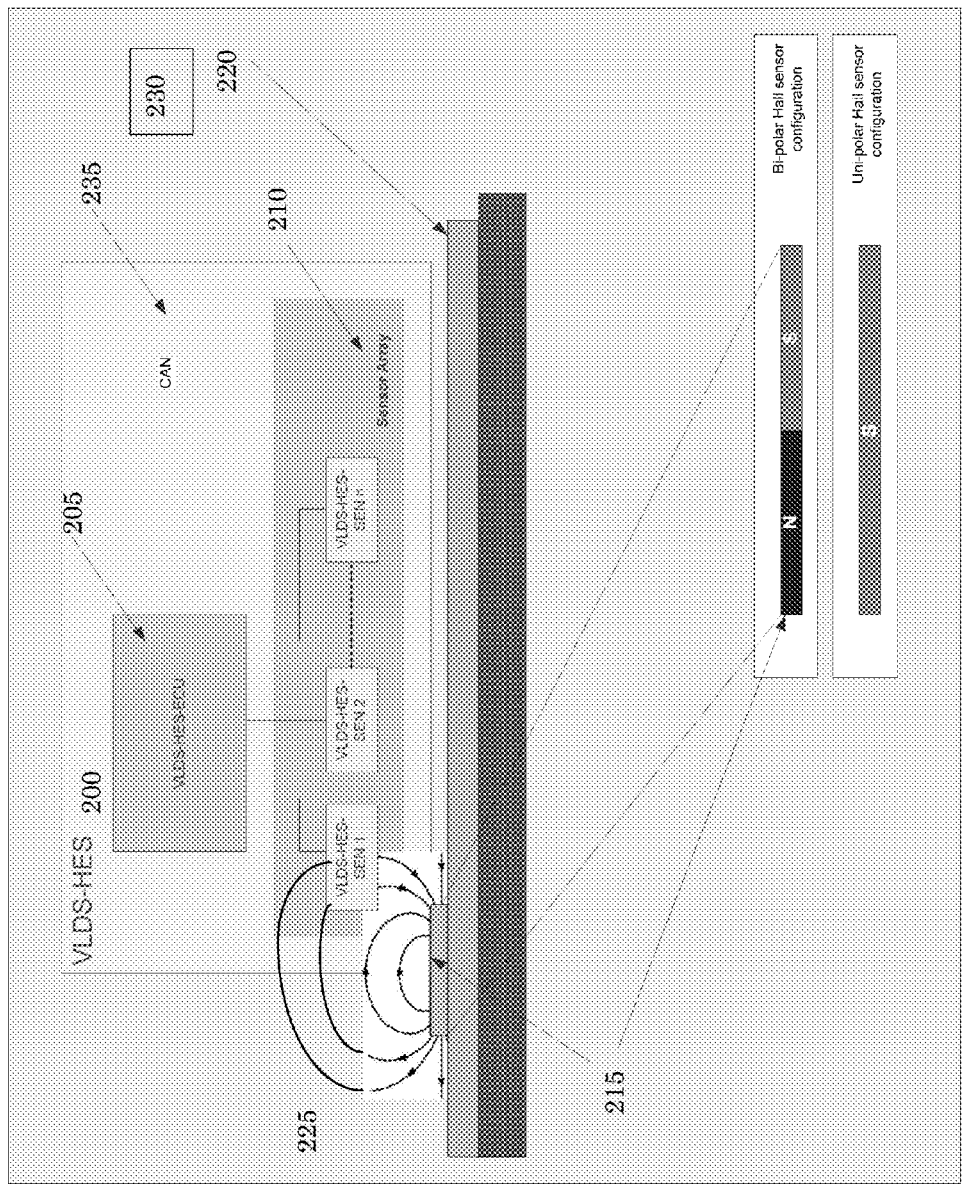
FIG. 2 is an example diagram of a vehicle lane departure system based on magnetic field flux detection in accordance with an embodiment.

FIG. 2 is a high level block diagram of an embodiment of a VLDS-HES 200. The VLDS-HES 200 includes, but is not limited to, a VLDS-HES electronics control module (VLDS-HES ECU) 205, an array of VLDS-HES sensors 210 shown as VLDS-HES-SEN 1, VLDS-HES-SEN 2, . . . , VLDS-HES-SEN n, and road or curb markers, guide lines, stripes, lane markers, and the like that are painted, coated or otherwise have some form of magnetic material (collectively "magnetic or magnetized markers 215") that are on a road surface 220. The magnetic or magnetized markers 215 on the road surface 220 generate a magnetic field 225 similar to a permanent magnet with 2 poles. The VLDS-HES sensors 210 entering and exiting this magnetic field flux 225 record this as a sine pulse translated, in general, as a pulse train having a certain frequency and/or duty cycle. See, for example, an illustrative pulse train in FIG. 4.

The pulse train information is then processed further in the VLDS-HES ECU 205, which can determine based on a pulse detection algorithm if there is a displacement in the x and/or y axis of the vehicle position as related to the magnetic or magnetized markers 215 measured in previous time stamps. Once a threshold limit is reached, a lane departure warning can be issued which alerts the driver of the vehicle condition. This warning can be, but is not limited to, visual, audible or vibrational alerts. The VLDS-HES ECU 205 can send out an alarm message on a vehicle bus 235, such as for example, a controller area network ("CAN"), Internet or local area network.

In another embodiment, the VLDS-HES ECU 205 can send raw sensor information or primitive data processing results on the vehicle bus 235 for further processing by other sub-systems 230 in the vehicle. Primitive data may constitute basic information such as speed measurements, number of pulses, stripe length and other like information. This information can be further used and/or combined with further algorithms for more complex function implementation, such as for example, autonomous vehicle operation. In another example, VLDS-HES 200 with sensor arrays 210 can provide information and guidance of the vehicle position and direction within ongoing traffic using magnetic or magnetized markers 215 such as road guide lines and/or stripes.

Figure 3A:
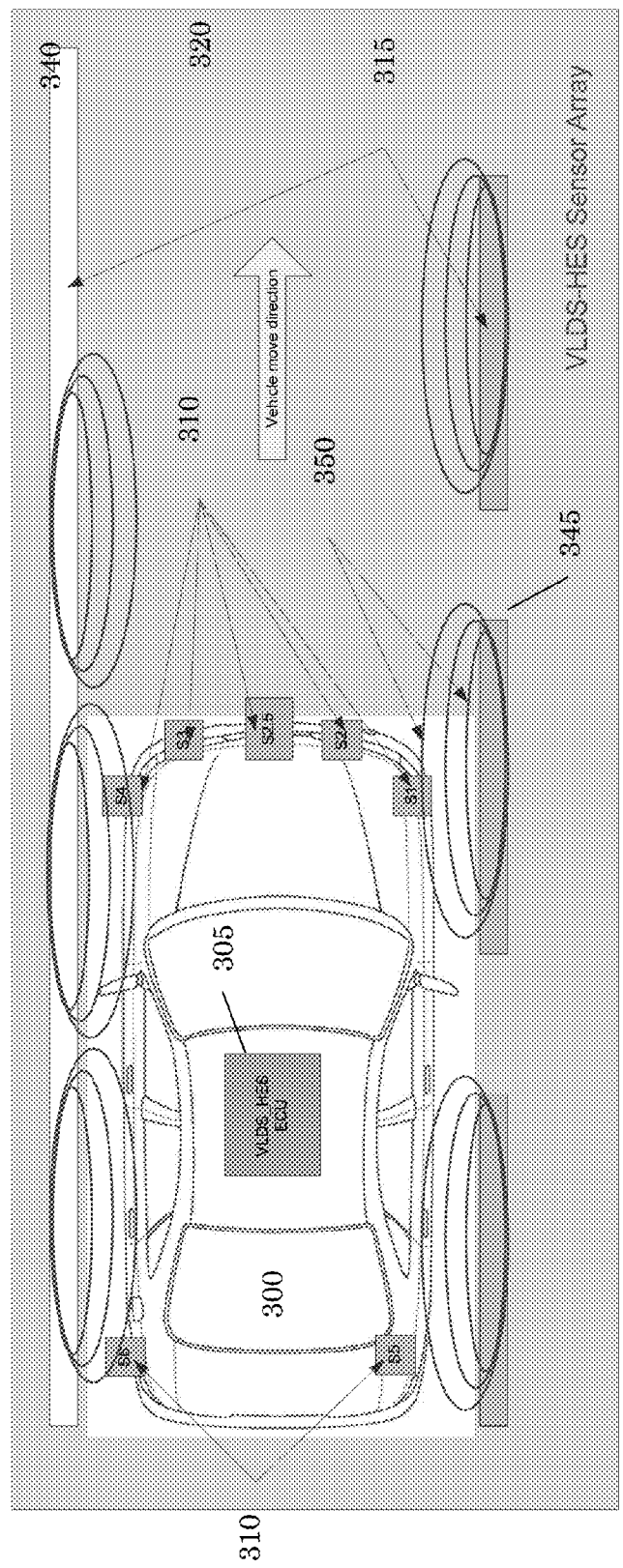
FIGS. 3A and 3B illustrate vehicle lane departure using a vehicle lane departure system based on magnetic field flux detection in accordance with an embodiment.
Figure 3B:
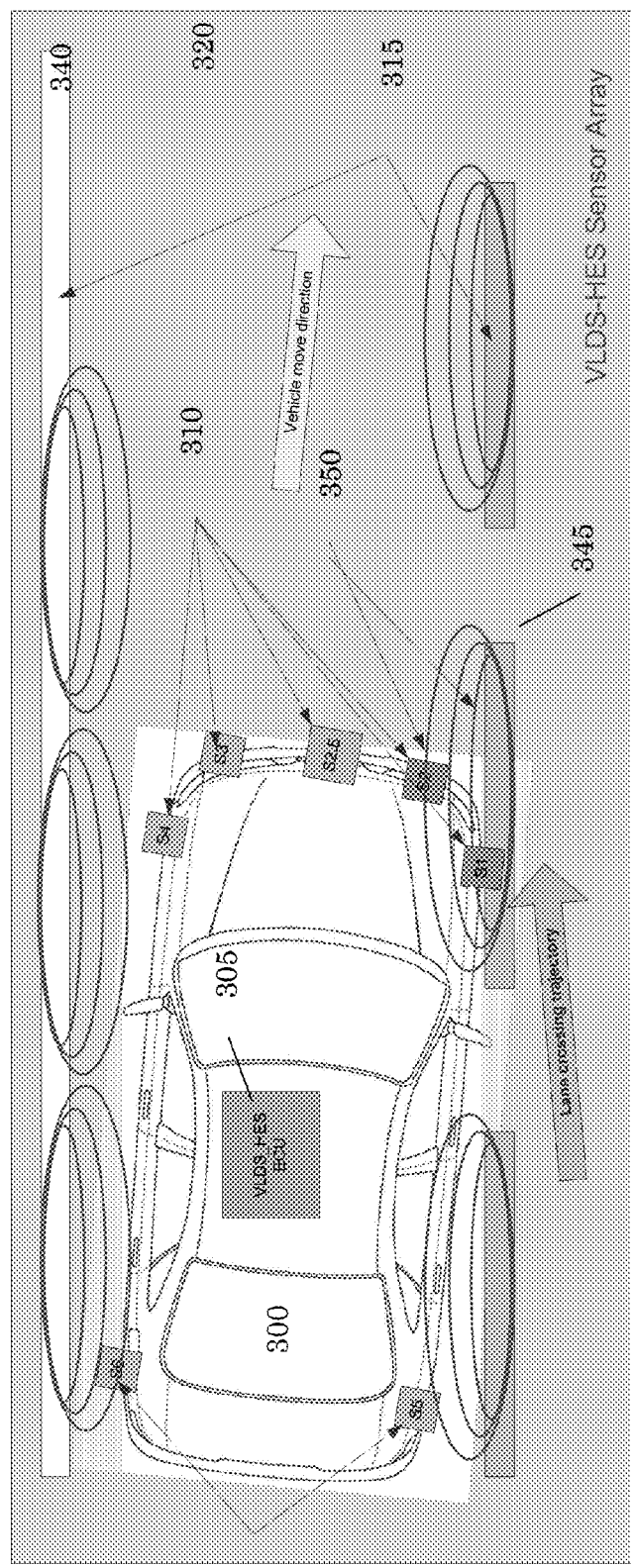

Referring now to FIGS. 3A and 3B, there is shown an a vehicle 300 including a VLDS-HES ECU 305 and a plurality of VLDS-HES sensors 310 strategically placed on the vehicle 300, i.e. S1, S2, S2.5, S3, S4, S5 and S6. The number of sensors and placement thereof is variable and dependent on the nature of the vehicle, nominal environmental conditions, nominal operating conditions, and other factors. The VLDS-HES ECU 305 can process data from multiple VLDS-HES sensors 310 at the same time, send a message on the vehicle bus if lane departure is detected and notify the operator via visual, audible or stimulation means or engage steering, braking and/or other subsystems to prevent lane departure or correct vehicle trajectory.

Figure 4:
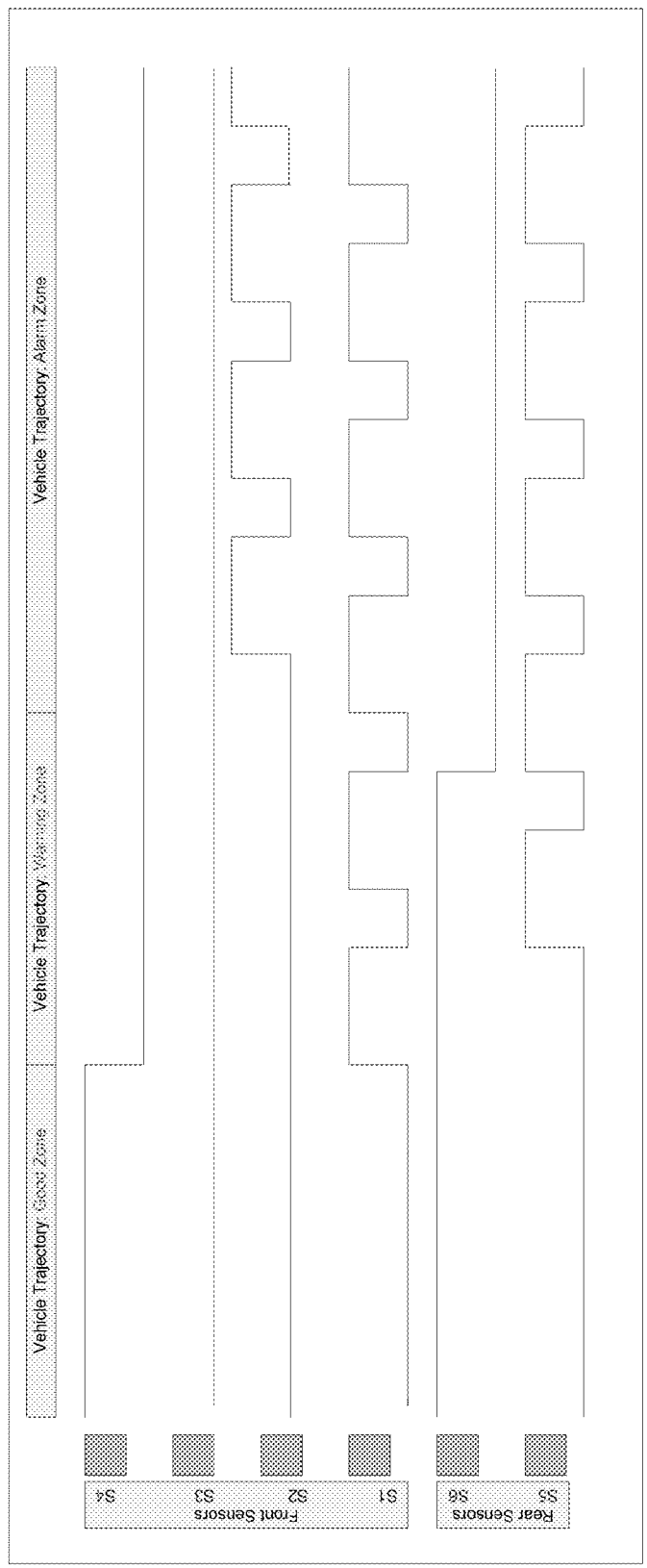
FIG. 4 is an example illustration of pulses from multiple sensors using a vehicle lane departure system based on magnetic field flux detection in accordance with an embodiment.

FIG. 3A illustrates the vehicle 300 moving in a straight line direction on the road 320. The vehicle 300 has a continuous line 340 on the left, (all directions from the perspective of a person sitting in the vehicle in the vehicle moving direction as indicated by the arrow), and dashed lines 345 on the right, where the continuous line 340 and the dashed lines 345 are types of magnetic or magnetized markers 315. Referring now also to FIG. 4, in the example shown in FIG. 3A, VLDS-HES sensors S4 and S6 will normally be high as they will be continuously detecting the magnetic flux in the continuous line 340. However, VLDS-HES sensors S1, S2, S2.5, S3 and S4 will normally be low. In the embodiments, logic for active/inactive is illustrative.

Referring now to FIGS. 3B and 4, as the vehicle 300 passes dashed lines 345, a change in magnetic field 350 is detected by the VLDS-HES sensors as current is induced. This induced current is interpreted as a pulse by the VLDS-HES sensors. When a change in the flow of current, or a change in pulse is detected, a lane departure method or algorithm in the VLDS-HES ECU 305 analyzes this further in conjunction with implemented traffic rules and predict vehicle trajectory in relation to the road guides. For example, the traffic rules may be traffic rules received from a global positioning system (GPS) and/or navigation system such as various speed zones or temporary lane change marking information due to road work which can be arbitrated in conjunction with the vehicle trajectory. In particular, as VLDS-HES sensor S1 enters the magnetic field 350, VLDS-HES sensor S1 can trigger an alarm and a second sensor, i.e. VLDHS-HES sensor S2 entering the same magnetic field 350 confirms that the vehicle is experiencing an unexpected vehicle trajectory change. The VLDS-HES ECU 305 algorithms are modified in conjunction with the applicable rules and regulations of the jurisdiction.

Figure 5:
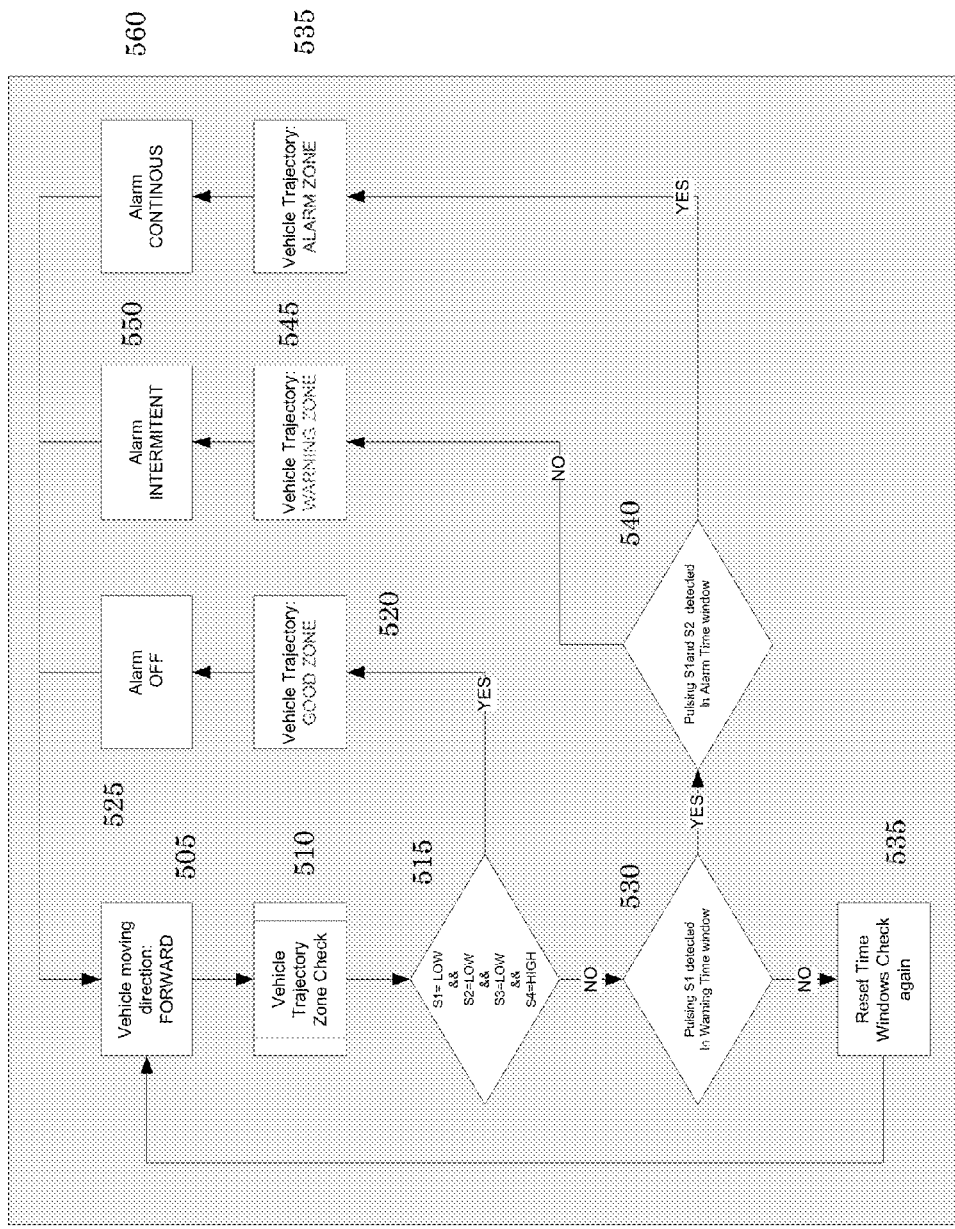
FIG. 5 is an example detection flowchart for use with a vehicle lane departure system based on magnetic field flux detection in accordance with an embodiment.

FIG. 5 is an example high level flowchart for determining lane departure. Referring also to FIGS. 3A, 3B and 4, a vehicle 300 is determined to be moving a specified direction (505) and a vehicle trajectory zone check is performed (510). For example, a high or low level is determined for each of VLDS-HES sensors S1, S2, S3 and S4 (515). If VLDS-HES sensor S4 is high as described herein above and VLDS-HES sensors S1, S2 and S3 are low, then the vehicle trajectory is in a good zone (520) and no alarms are set or if any alarms are already on, the alarms are turned off (525).

If VLDS-HES sensor S1 is high, then a warning time window is started (530). If during the warning time window VLDS-HES sensor S5 remains low, then it is assumed that the vehicle trajectory was corrected or it was a false alarm and the warning time window is rest and the lane departure method cycles from the beginning to determine vehicle lane position (535). If during the warning time window VLDS-HES sensor S5 becomes high, then an alarm zone window is started (540). If during the alarm time window VLDS-HES sensor S2 remains low, then the vehicle trajectory is determined to be in a warning zone (545) and an intermittent alarm is initiated using one of the alarm nodes described herein above (550). The lane departure method cycles again to determine vehicle lane position.

If during the alarm time window VLDS-HES sensor S2 becomes high, then the vehicle trajectory is determined to be in a alarm zone (555) and a continuous alarm is initiated using one of the alarm nodes described herein above (560). The lane departure method cycles again to determine vehicle lane position.

Figure 6:
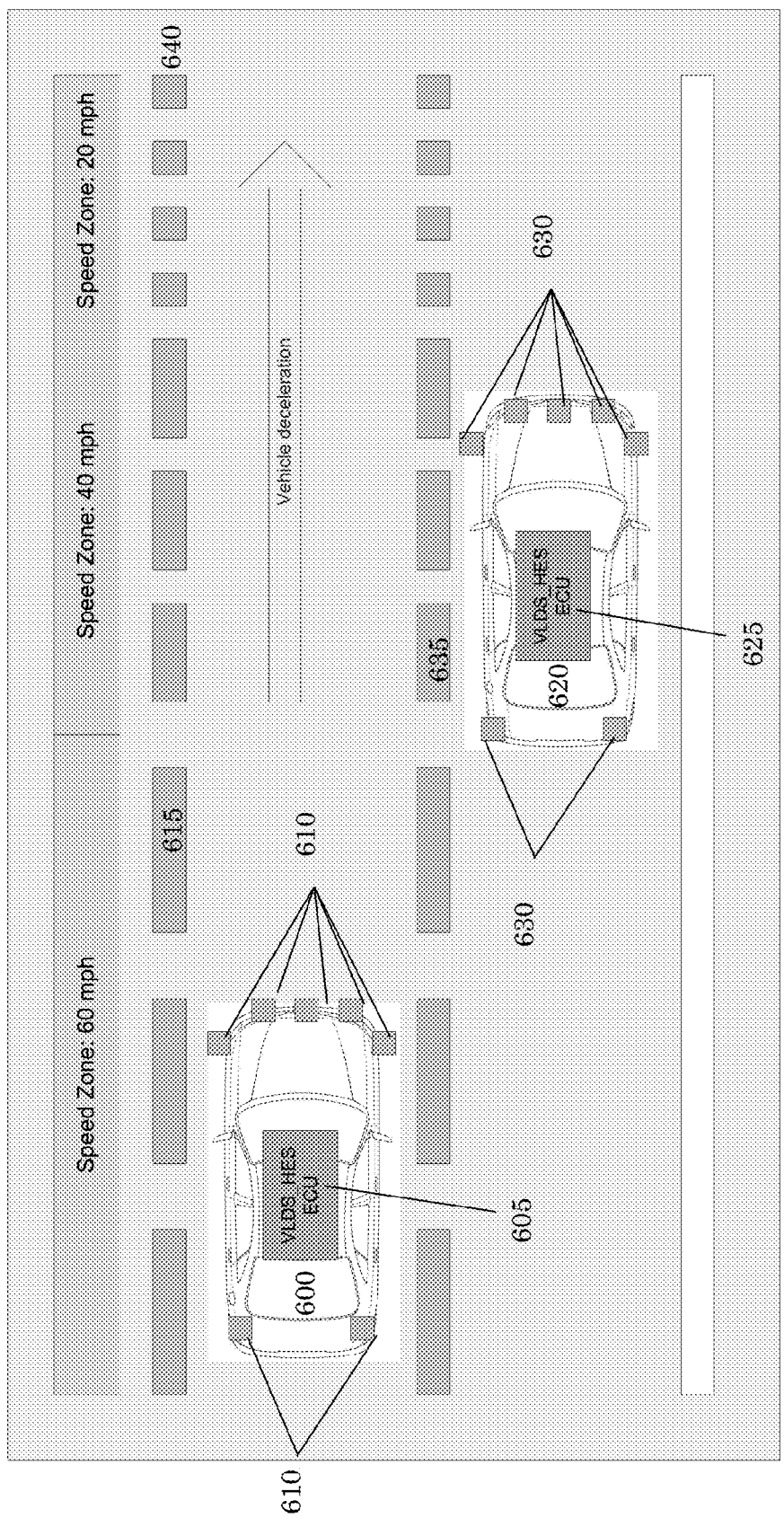
FIG. 6 is an example illustration of speed zone detection using a vehicle lane departure system based on magnetic field flux detection in accordance with an embodiment.

FIG. 6 is an embodiment of a VLDS-HES that can be used for speed zone determinations. In general, the VLDS_HES may detect the length of a magnetized road stripe. The system could be used to define speed zones, where the length of stripe defines the zone. For example, large road stripes represent faster speed limits, smaller stripes represent slower speed zones and/or deceleration zones. In particular, a vehicle 600 including a VLDS-HES ECU 605 and VLDS-HES sensors 610 can determine the length of the magnetized road strips 615 and determine that it is in a 60 MPH zone. This may be sent to other vehicle subsystems over the vehicle bus to alert the user. Another vehicle 620 including a VLDS-HES ECU 625 and VLDS-HES sensors 630 may determine that the magnetized road stripes 635 are smaller and represent a 40 MPH zone. This information may be relayed to the user. In another embodiment, magnetized road stripes 635 and 640 may represent deceleration zones for oncoming vehicles and an alert is therefore conveyed to the user to act accordingly. In another embodiment, the vehicles 600 and 620 may react autonomously to the different speed zones in accordance with the appropriate rules and regulations.

Figure 7:
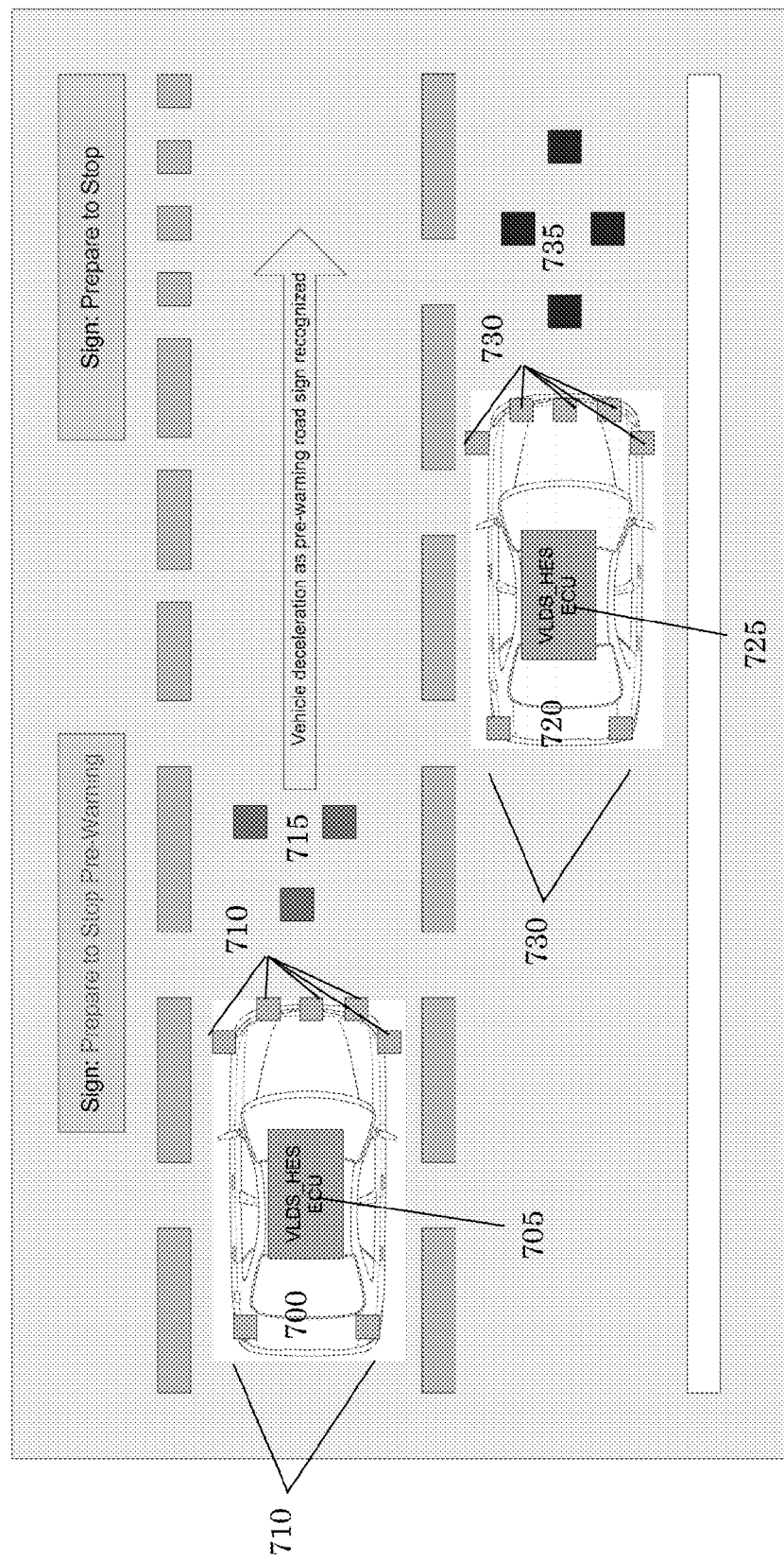
FIG. 7 is an example illustration of traffic sign detection using a vehicle lane departure system based on magnetic field flux detection in accordance with an embodiment.

FIG. 7 is an embodiment of a VLDS-HES that can be used for road pattern recognition and/or traffic signs. In general, the VLDS-HES can recognize road signs and/or traffic signs magnetically marked on the road. The VLDS-HES will process the information read back by the sensors and take appropriate actions and/or pre-warn the user or driver. In particular, a vehicle 700 including a VLDS-HES ECU 705 and VLDS-HES sensors 710 can recognize magnetized road signs or markers 715 and determine that a deceleration zone is ahead and act accordingly. This may be sent to other vehicle subsystems over the vehicle bus to alert the user. Another vehicle 720 including a VLDS-HES ECU 725 and VLDS-HES sensors 730 may recognize magnetized road markers 735 and determine that a stop sign is ahead and act accordingly. In another embodiment, the vehicles 700 and 720 may react autonomously to the different magnetized road markers 715 and 735 in accordance with the appropriate rules and regulations.

In another embodiment, a VLDS-HES system can detect which lane the vehicle is in through differentiation of solid and striped lines. This information can be used in concert with vehicle speed, steering angle and other information available via a vehicle bus, such as a CAN, to autonomously make corrections or associated decisions to drive the vehicle.

In general, a vehicle lane departure system includes a plurality of magnetic field detectors positioned on a vehicle to detect magnetic fields from magnetic road markers on a road and an electronic control unit (ECU) connected to the plurality of magnetic field detectors. The ECU initiates an event on a condition that certain magnetic field detectors of the plurality of magnetic field detectors detect a magnetic field with respect to a magnetic road marker. In an embodiment, the at least one predetermined action occurs in response to the event. In another embodiment, the event is a warning zone event on a condition that the certain magnetic field detectors are a front magnetic field detector and a rear magnetic field detector. In another embodiment, the event is an alarm zone event on a condition that the certain magnetic field detectors are at least two front magnetic field detectors and a rear magnetic field detector.

In an embodiment, a length associated with the magnetic road markers corresponds to a predetermined speed zone. In another embodiment, a length associated with the magnetic road markers corresponds to deceleration zone.

In an embodiment, a pattern of the magnetic road markers corresponds to an upcoming traffic sign or condition.

In general, a method for vehicle lane departure includes providing a plurality of magnetic field detectors for positioning on a vehicle to detect magnetic fields from magnetic road markers on a road, providing an electronic control unit (ECU) connected to the plurality of magnetic field detectors and initiating by the ECU an event on a condition that certain magnetic field detectors of the plurality of magnetic field detectors detect a magnetic field with respect to a magnetic road marker. In an embodiment, the method further includes performing at least one predetermined action in response to the event. In another embodiment, the event is a warning zone event on a condition that the certain magnetic field detectors is a front magnetic field detector and a rear magnetic field detector. In another embodiment, the event is an alarm zone event on a condition that the certain magnetic field detectors is at least two front magnetic field detectors and a rear magnetic field detector.

In an embodiment, a length associated with the magnetic road markers corresponds to a predetermined speed zone. In another embodiment, a length associated with the magnetic road markers corresponds to deceleration zone. In another embodiment, a pattern of the magnetic road markers corresponds to an upcoming traffic sign or condition.

In an embodiment, the method further includes detecting by a front magnetic field detector of a magnetic field, starting a warning time window, starting an alarm time window on a condition that a rear magnetic field detector detects another magnetic field in the warning time window, and sending an alarm on a condition that a second front magnetic field detector detects the magnetic field in the alarm time window, where the front magnetic field detector, the rear magnetic field detector and the second front magnetic field detector are at least the certain magnetic field detectors and the event is an alarm.

In an embodiment, a warning is sent on a condition that the alarm time window expires without additional magnetic field detections and the event is a warning. In an embodiment, the event are corrective actions taken by user or the vehicle to correct vehicle lane departure. In an embodiment, the event are actions taken by a user or the vehicle in response to the magnetic road markers being associated with traffic signs or conditions.

As described herein, the methods described herein are not limited to any particular element(s) that perform(s) any particular function(s) and some steps of the methods presented need not necessarily occur in the order shown. For example, in some cases two or more method steps may occur in a different order or simultaneously. In addition, some steps of the described methods may be optional (even if not explicitly stated to be optional) and, therefore, may be omitted. These and other variations of the methods disclosed herein will be readily apparent, especially in view of the description of the systems described herein, and are considered to be within the full scope of the invention.

Although features and elements are described above in particular combinations, each feature or element can be used alone without the other features and elements or in various combinations with or without other features and elements.

What is claimed is:
1. A vehicle lane departure system, comprising:
a plurality of magnetic field detectors positioned on a vehicle to detect magnetic fields from magnetic road markers on a road;
an electronic control unit (ECU) connected to the plurality of magnetic field detectors, wherein the ECU initiates an event when at least certain magnetic field detectors of the plurality of magnetic field detectors detect a magnetic field with respect to a magnetic road marker;

a front magnetic field detector of the magnetic field to start a warning time window;

a rear magnetic field detector to start an alarm time window when the rear magnetic field detector detects another magnetic field in the warning time window; and a second front magnetic field detector sends an alarm when the second front magnetic field detector detects the magnetic field in the alarm time window, wherein the front magnetic field detector, the rear magnetic field detector and the second front magnetic field detector are the at least the certain magnetic field detectors of the plurality of magnetic field detectors and the event is an alarm.

2. The vehicle lane departure system of claim 1, wherein at least one predetermined action occurs in response to the event.

3. The vehicle lane departure system of claim 1, wherein the event is a warning zone event when the at least certain magnetic field detectors of the plurality of magnetic field detectors is a front magnetic field detector and a rear magnetic field detector.

4. The vehicle lane departure system of claim 1, wherein the event is an alarm zone event when the at least certain magnetic field detectors of the plurality of magnetic field detectors is at least two front magnetic field detectors and a rear magnetic field detector.

5. The vehicle lane departure system of claim 1, wherein a length associated with the magnetic road markers corresponds to a predetermined speed zone.

6. The vehicle lane departure system of claim 1, wherein a length associated with the magnetic road markers corresponds to deceleration zone.

7. The vehicle lane departure system of claim 1, wherein a pattern of the magnetic road markers corresponds to an upcoming traffic sign or condition.

8. A method for vehicle lane departure, the method comprising:

providing a plurality of magnetic field detectors for positioning on a vehicle to detect magnetic fields from magnetic road markers on a road;

providing an electronic control unit (ECU) connected to the plurality of magnetic field detectors;

initiating by the ECU an event when at least certain magnetic field detectors of the plurality of magnetic field detectors detect a magnetic field with respect to a magnetic road marker;

detecting a magnetic field by a front magnetic field detector;

starting a warning time window;

starting an alarm time window when a rear magnetic field detector detects another magnetic field in the warning time window; and sending an alarm when a second front magnetic field detector detects the magnetic field in the alarm time window, wherein the front magnetic field detector, the rear magnetic field detector and the second front magnetic field detector are the at least certain magnetic field detectors of the plurality of magnetic field detectors and the event is an alarm.

9. The method of claim 8, further comprising:

performing at least one predetermined action in response to the event.

10. The method of claim 8, wherein the event is a warning zone event when the at least certain magnetic field detectors of the plurality of magnetic field detectors is at least one front magnetic field detector and a rear magnetic field detector.

11. The method of claim 8, wherein the event is an alarm zone event when the at least certain magnetic field detectors of the plurality of magnetic field detectors is at least two front magnetic field detectors and a rear magnetic field detector.

12. The method of claim 8, wherein a length associated with the magnetic road markers corresponds to a predetermined speed zone.

13. The method of claim 8, wherein a length associated with the magnetic road markers corresponds to deceleration zone.

14. The method of claim 8, wherein a pattern of the magnetic road markers corresponds to an upcoming traffic sign or condition.

15. The method of claim 8, wherein a warning is sent when the alarm time window expires without additional magnetic field detections and the event is a warning.

16. The method of claim 8, wherein the event are corrective actions taken by user or the vehicle to correct vehicle lane departure.

17. The method of claim 8, wherein the event are actions taken by a user or the vehicle in response to the magnetic road markers being associated with traffic signs or conditions.

* * * * *